(12) United States Patent
Irwin

(10) Patent No.: US 6,588,776 B1
(45) Date of Patent: Jul. 8, 2003

(54) CASTER ADJUSTER FOR A WHEEL ASSEMBLY

(75) Inventor: Earl James Irwin, Fort Wayne, IN (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 09/880,865

(22) Filed: Jun. 15, 2001

(51) Int. Cl.[7] ............................................. B60G 7/02
(52) U.S. Cl. ........................ 280/86.751; 280/86.754; 280/86.756
(58) Field of Search ................. 280/86.754, 86.756, 280/86.751, 86.752, 86.755, 93.512, 124.125

(56) References Cited

U.S. PATENT DOCUMENTS

| | | | |
|---|---|---|---|
| 2,092,611 A | | 9/1937 | Olley |
| 3,147,025 A | * | 9/1964 | Good .................... 280/86.756 |
| 3,273,909 A | | 9/1966 | Muller |
| 3,285,622 A | | 11/1966 | Castoe |
| 4,921,271 A | * | 5/1990 | Berry et al. ........... 280/86.756 |
| 5,009,447 A | * | 4/1991 | Gabel ..................... 280/5.521 |
| 5,269,546 A | * | 12/1993 | Pollock et al. ............. 280/81.6 |
| 5,538,273 A | | 7/1996 | Osenbaugh |
| 5,749,594 A | | 5/1998 | Krisher |
| 5,992,863 A | | 11/1999 | Forbes-Robinson |
| 6,302,233 B1 | * | 10/2001 | Okamuro et al. ........... 180/253 |
| 6,371,500 B1 | * | 4/2002 | Goddard ................ 280/86.754 |

* cited by examiner

Primary Examiner—Paul N. Dickson
Assistant Examiner—Toan C To
(74) Attorney, Agent, or Firm—Liniak, Berenato & White

(57) ABSTRACT

An adjustable mounting assembly for a steerable wheel assembly. A pin member is horizontally movably disposed within a slot formed in the lower arm of a yoke assembly. A ball joint forging is adjustably secured to the lower arm. The pin member extends between the lower arm and a ball joint forging to facilitate selective adjustment therebetween. A pair of set screws are secured to the lower arm to engage opposite sides of the pin member to selectively move the pin member within the slot. By simply rotating the set screws, the pin member is horizontally adjusted to selectively move the ball joint forging in a horizontal direction to adjust the caster of the wheel assembly. Horizontal slots are formed in the lower arm to align with boltholes formed in the ball joint forging to allow the forging to be bolted to the lower arm over a range of horizontal positions.

8 Claims, 2 Drawing Sheets

CASTER ADJUSTER FOR A WHEEL ASSEMBLY

BACKGROUND OF THE INVENTION

1. Field of the Invention

The present invention relates to caster adjustment and more particularly to a selectably movable pin member to adjust the caster of a steerable wheel assembly.

2. Background of the Related Art

Ball joints have long been used in automobiles to provide for rotatable motion between the spindle and control arms of a motor vehicle. Adjustments are often needed between the spindle and control arms to provide for the proper camber and caster. One of the more common ways of providing this adjustment is to provide an eccentric member which, when rotated, changes the relative position of the spindle with respect to the control arms. In another known construction, the ball joint has a ball stud with an eccentric shank which when rotated relatively moves the eccentric shank and its connected arm with respect to the ball and its connected arm.

In addition, another common way to provide adjustment is with a sleeve surrounding the ball stud having an eccentrically placed holelextending therethrough. When the sleeve is rotated, it adjustably positions the ball stud. Numerous other deficient ways to adjust caster are also known within the arts.

The problems with the prior art designs are that caster can not be adjusted without also affecting the camber, distance between upper and lower ball joints, or the pre-load of the ball joints. In addition the range of adjustment is limited and the assembly and method of adjustment is not simple. It is desirous to have an adjustment device that easily allows varied caster adjustment within a range without affecting camber and sets and holds the position of the ball joint forging while adjusting the caster angle of the wheel end.

SUMMARY OF THE INVENTION

The present invention alleviates the drawbacks of the related art. An adjustable mounting assembly for a steerable wheel assembly has a pin member displaceably disposed within a recess formed in the lower arm of a yoke assembly. A pair of set screws are disposed on either side of said pin member within said recess to adjustably retain said pin member within the recess. By simply rotating the set screws, the pin member is displaced thus moving the ball joint forging in a horizontal direction to adjust the caster of the wheel assembly. Horizontal slots are formed in the lower arm to align with boltholes formed in the ball joint forging to allow the ball joint forging to be bolted to the lower arm over a range of horizontal positions. A method of adjusting the caster of the wheel assembly is also disclosed. The present arrangement and method allows varied caster adjustment within a range without affecting camber and maintains the position of the ball joint forging while adjusting the caster angle of the wheel end during assembly.

Other objects and advantages of the invention will become apparent from a study of the following specification when viewed in light of the accompanying drawings.

DETAILED DESCRIPTION OF THE PREFFERED EMBODIMIENT

Figure 1:
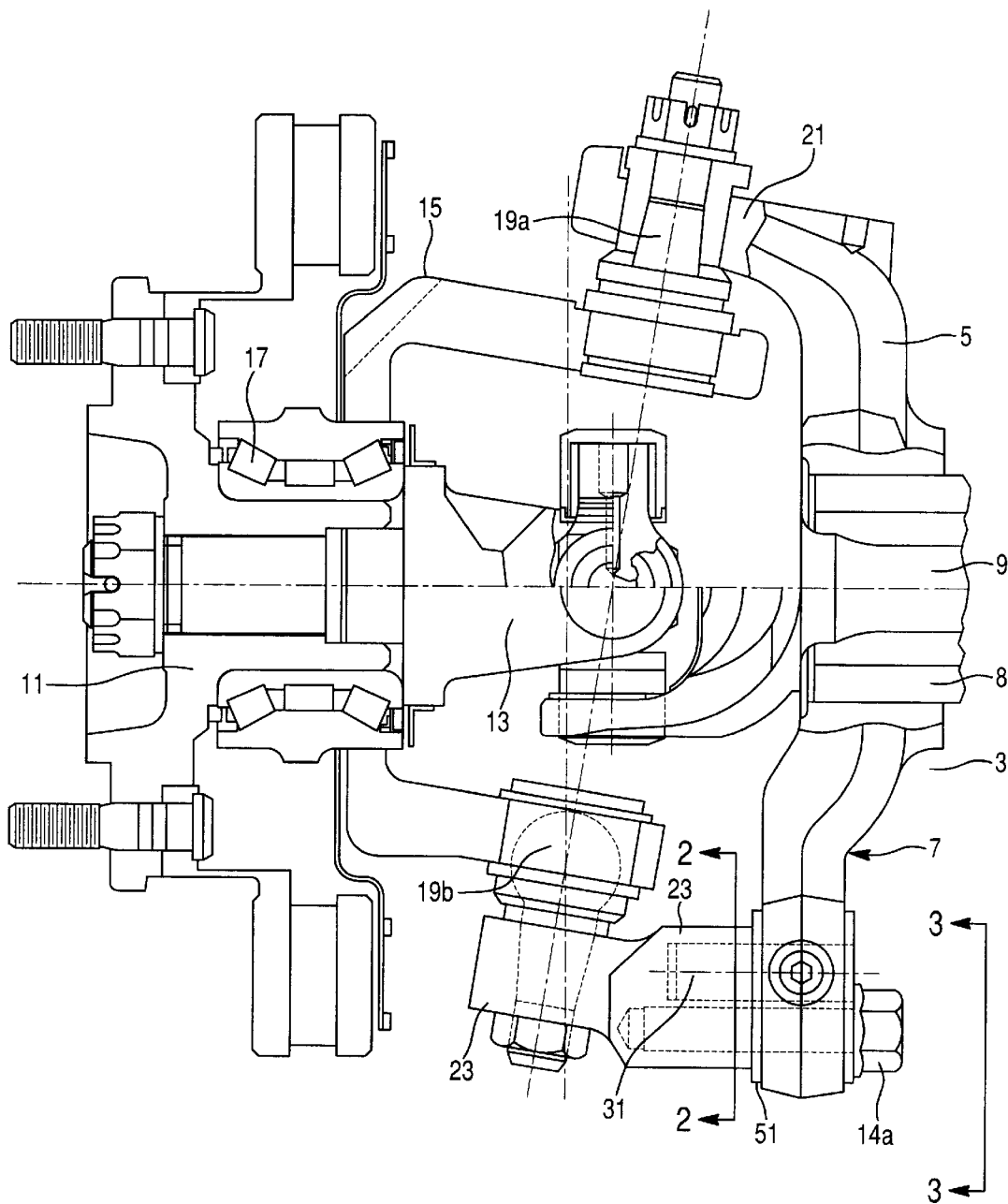
FIG. 1 is a sectional view of a steerable wheel suspension system incorporating the caster adjustment mechanism of the present invention.

FIG. 1 depicts an entire steerable wheel end assembly. A yoke 3 having an upper arm 5 and a lower arm 7 is secured to a vehicle in a conventional manner (not shown). A drive axle 9 extends through axle tube 8 and a center portion of the yoke 3 in driving connection with the wheel hub 11 through a constant velocity joint 13. The upper 5 and lower arms 7 are connected to a knuckle 15 or other member, which in turn rotatably supports the hub 11 through bearings 17. The upper 5 and lower 7 arms are connected to the knuckle 15 through a pair of ball stud joints 19a, 19b.

Preferably, the upper arm 5 contains a ball joint forging 21 unitarily formed therewith adapted to receive the ball stud. A separate second ball joint forging 23 is adjustably secured to the lower arm 7 of the yoke 3 the details of which will be explained later.

A pin member 31 is disposed between and engages the lower arm 7 and second ball joint forging 23. A portion of the pin member 31 is press fit within a bore hole 25 of the second ball joint forging 23. Another portion of the pin member is horizontally displaceable within a horizontal slot 6 of the lower arm 7. Thus it is clear that the second ball joint forging may be adjustably connected to the lower arm 7 by simply selectively positioning the pin member 31 within slot 6. To facilitate this selective positioning, a pair of set screws 12a, 12b threadingly engage bore holes extending from either sides of the pin member 31 and slot 6 whereby coordinated adjustment of the set screws 12a, 12b causes the pin member 31 to move horizontally relative to said lower arm 7. This arrangement facilitates adjustment of the wheel caster without significantly affecting camber.

In order to facilitate independent camber adjustment, a spacer 51 or shim is disposed between the second ball joint forging 23 and the lower arm 7. By simply adjusting the thickness of the spacer 51, or alternatively the thickness of a plurality of spacers, camber may be independently adjusted.

The pin member 31 is preferably formed of a unitary piece of metal, such as steel, but may be formed of other suitable material, which will displace the lower ball joint forging 23 without significant wear.

Figure 2:
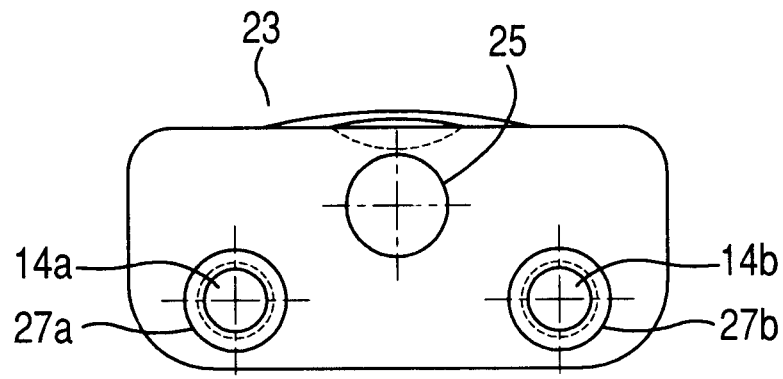
FIG. 2 is a cross sectional view taken along line 2—2 of FIG. 1.
Figure 3:
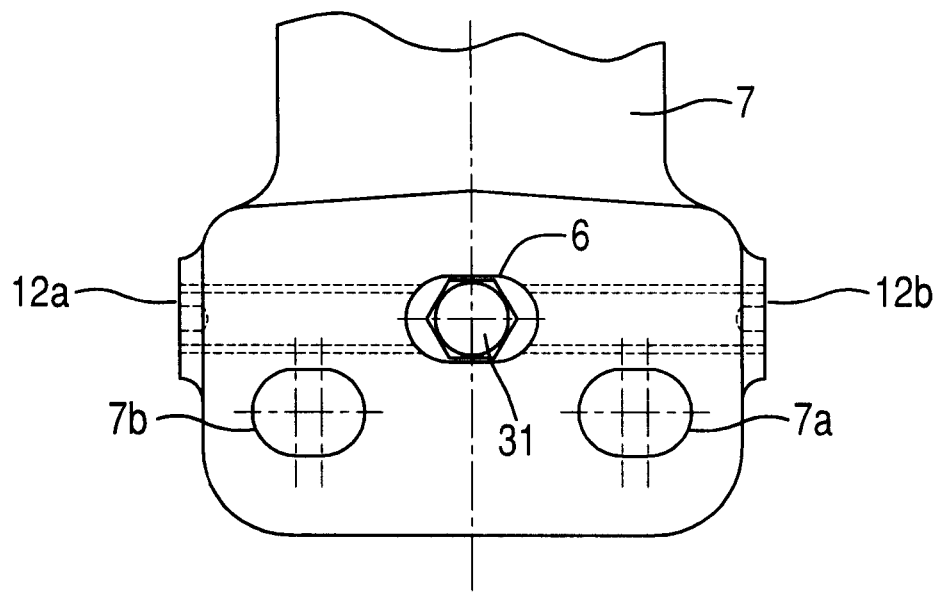
FIG. 3 is an isolated side view of the lower arm of the yoke of FIG. 1 taken from view 3—3.

Referring to FIG. 2, the second ball joint forging 23 has a pair of bolt holes 27a, 27b for receiving a pair of bolts to connect to the lower arm 7. As can be seen in FIG. 3, the lower arm 7 has a pair of corresponding horizontally extending slots 7a, 7b adapted to receive bolts to allow the second ball joint forging 23 to be horizontally adjustably bolted to the lower arm 7. The pair of slots 7a, 7b horizontally extend sufficiently to allow the second ball joint forging 23 its full horizontal range of displacement as the pin member 31 is displaced within slot 6. Such an arrangement allows for the second ball joint forging 23 to be loosely connected to the lower arm 7 while adjusting the wheel caster. Once the adjustment has been made and the wheel assembly is in the proper position the bolts 14a, 14b are simply tightened and the ball joint forging 23 and lower arm 7 are securely connected.

The method of adjusting the caster of the wheel assembly is simple. The pin member 31 is simply inserted within the first horizontally oriented slot 6 of the lower arm 7. The second ball joint forging 23 is loosely connected to the lower arm 7 by inserting a pair of bolts 14a, 14b through the bolt holes 27a, 27b and horizontal slots 7a, 7b of the lower arm 7. The bolts are loosely tightened. The remainder of the wheel assembly is arranged as shown in FIG. 1. The particular steps of assembling the components of FIG. 1 will not be explained in detail and are apparent to one of ordinary skill in the art from view FIG. 1. A tool is used to engage and rotate the set screws 12a, 12b to coordinate their rotation within the lower arm 7 to horizontally displace the pin member 31 and move second ball joint forging 23 to a desired position relative to the lower arm 7 to achieve a specific wheel end caster. Once the desired position and caster is obtained, the bolts 14a, 14b are simply tightened and the connection between the second ball joint forging 23 and the lower arm 7 is firmly secured. The arrangement of the present invention provides a simple mechanism to adjust wheel end caster without affecting camber or other wheel end characteristics. Moreover, the present invention provides the ability to develop and set identical caster setting for both right and left hand wheel ends to reduce cross-caster problems.

While the foregoing invention has been shown and described with reference to a preferred embodiment, it will be understood by those possessing skill in the art that various changes and modifications may be made without departing from the spirit and scope of the invention. For example, while the preferred embodiment preferably disposed the cam member between the lower arm and the lower ball joint forging, such a cam member can be disposed between the upper arm and upper ball joint forging.

What is claimed is:

1. An adjustable mounting assembly for a steerable wheel assembly comprising:
    a yoke having an upper arm and a lower arm;
    a first ball joint forging secured to one of said upper and lower arms of said yoke;
    a second ball joint forging adjustably secured to the other of said upper and lower arms of said yoke;
    a pin member interposed between said second ball joint forging and said other arm of said yoke and being horizontally adjustably disposed within a first slot in said other arm of said yoke whereby horizontal movement of said pin member within said other arm causes relative movement of said second ball joint forging relative to said other arm; and
    at least one bolt connecting said second ball joint forging to said other arm of said yoke, said bolt extending through a second horizontal slot formed in said other arm and threadingly engaging a bolthole in said second ball joint forging to thereby allow a secured adjustment of said second ball joint forging relative to said other arm.

2. The adjustable mounting assembly according to claim 1, further comprising two set screws adjustably secured to said other arm and disposed one each on opposite sides of said pin member whereby adjustment of said set screws causes said pin member to move horizontally relative to said other arm.

3. The adjustable mounting assembly according to claim 1, said second ball joint forging has at least two bolt holes extending therethrough provided to align with a corresponding one of two second horizontal slots formed in said other arm to allow a bolt to extend through said bolt holes and said slots to facilitate a substantially horizontally adjustable connection between said second ball joint forging and said other arm.

4. The adjustable mounting assembly according to claim 3, wherein said second ball joint forging is secured to said lower arm.

5. The adjustable mounting assembly according to claim 4, wherein said yoke and said first ball joint forging are unitarily formed as a single forging.

6. The adjustable mounting assembly according to claim 1, wherein said pin member has a second portion pressed within a blind hole of said second ball joint forging thereby establishing an adjustable connection between said second ball joint forging and other arm; said assembly further comprising:
    a pair of set screws adjustably secured to said lower arm to engage opposite sides of said pin member whereupon coordinated rotation of said set screws causes said pin member to horizontally move within said first horizontal slot thereby causing said second ball joint forging to move relative to said other arm.

7. A method of adjusting the adjustable mounting assembly of claim 6 to adjust a caster of said steerable wheel assembly, said method comprising the steps of:
    loosely connecting said second ball joint forging to said other arm to allow horizontal movement of said second ball joint forging;
    rotating said set screws to horizontally displace said pin member and said second ball joint forging to a desired position relative to said other arm; and
    securely connecting said second ball joint forging relative to said other arm to lock said second ball joint forging in said desired position relative to said other arm.

8. An adjustable mounting assembly for a steerable wheel assembly comprising:
    a yoke having an upper arm and a lower arm;
    a first ball joint forging unitarily formed with said upper arm of said yoke;
    a second ball joint forging adjustably secured to said lower lower arm of said yoke;
    a pin member pin member having a portion disposed within a first horizontal slot of said lower arm to facilitate horizontal displacement relative thereto and having a second portion pressed within a blind hole of said second ball joint forging thereby establishing an adjustable connection between said second ball joint forging and said lower arm;
    a pair of set screws adjustably secured to said lower arm to engage opposite sides of said pin member whereupon coordinated rotation of said set screws causes said pin member to horizontally move within said first horizontal slot thereby causing said second ball joint forging to move relative to said lower arm; and
    a pair of bolts connecting said second ball joint forging to said lower arm of said yoke, said bolts extending through a corresponding one of a pair of second horizontal slots formed in said lower arm to thereby allow horizontal adjustment of said second ball joint forging relative to said other arm.

* * * * *